United States Patent
Hubbard

(10) Patent No.: US 6,745,239 B1
(45) Date of Patent: Jun. 1, 2004

(54) METHOD AND SYSTEM FOR MIGRATING CONFIGURATION SETTINGS INTO A COMPUTING SYSTEM

(75) Inventor: Edward A. Hubbard, Round Rock, TX (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 09/377,727

(22) Filed: Aug. 19, 1999

(51) Int. Cl.$^7$ ............................................... G06F 13/00
(52) U.S. Cl. ........................ 709/220; 709/203; 709/217; 709/219
(58) Field of Search .................................. 709/200, 201, 709/203, 206, 207, 208, 217, 218, 219, 224, 227, 228, 229, 220

(56) References Cited

U.S. PATENT DOCUMENTS

| | | | | |
|---|---|---|---|---|
| 5,826,000 A | * | 10/1998 | Hamilton | 395/182.02 |
| 5,852,722 A | * | 12/1998 | Hamilton | 395/200.51 |
| 5,862,339 A | | 1/1999 | Bonnaure et al. | 395/200.57 |
| 6,012,088 A | * | 1/2000 | Li et al. | 709/219 |
| 6,336,101 B1 | * | 1/2002 | Dean et al. | 705/29 |

FOREIGN PATENT DOCUMENTS

WO  9826548 A1  6/1998

OTHER PUBLICATIONS

Pending Patent Application: Amy Van Wyngarden: "*Method and Apparatus for Providing and Accessing Data at an Internet Site*"; Dell USA, L.P.

Pending Patent Application: Richard D. Amberg, Roger W. Wong, Michael A. Brundridge: "*Database for Facilitating Software Installation and Testing for a Build–to–Order Computer System*"; Dell USA, L.P.

Pending Patent Application: Ken Henson: "*Method and Apparatus for Providing Customer Configured Machines at an Internet Site*"; Dell USA, L.P.

Pending Patent Application: Alan E. Beelitz, Richard D. Amberg: "*Recoverable Software Installation Process and Apparatus for a Computer System*"; Dell USA, L.P.

* cited by examiner

*Primary Examiner*—Moustafa M. Meky
(74) *Attorney, Agent, or Firm*—Baker Botts L.L.P.

(57) ABSTRACT

A method and system for migrating configuration settings into a computing system are disclosed. The method and system allow a user with an existing computing system to benefit from efforts expended setting up the existing computing system. When the user places an order with a computer supplier for a computing system, the computer supplier determines whether the user placing the order has an existing internet service provider (ISP) relationship. When the user has an existing ISP relationship, the computer supplier preferably contacts the ISP with which the user has the relationship and obtains configuration data associated with the existing ISP relationship. The configuration data is made accessible to the computing system so that the user of the computing system may access the Internet via the user's existing ISP relationship.

20 Claims, 1 Drawing Sheet

METHOD AND SYSTEM FOR MIGRATING
CONFIGURATION SETTINGS INTO A
COMPUTING SYSTEM

TECHNICAL FIELD

The present disclosure relates in general to configuring a computing system and, more particularly, to a method and system for migrating configuration settings into a computing system.

BACKGROUND

The computer industry continues to provide the computing public with new and more powerful machines. Many of these new machines seem to be easier to use than earlier machines. Combining more processing power with simplified operation has allowed computers and, specifically, personal computers to gain widespread usage across many segments of society. This usage has exploded in recent years as users have begun to acquaint themselves with the power of networking and the wealth of information available in places like the Internet.

While many computer users require their machines to be simple to operate, the simplicity that these users accept is often better described as perceived simplicity, a simplicity provided by very complex software operating "behind the scene". The perception of simplicity is maintained as long as the software runs glitch free and the user is not required to do much set up work. Many computer users prefer that their computers have "plug and go" capability (i.e., the user merely powers on the computer and begins using it without performing any set up work).

With this in mind, computer manufacturers and suppliers have begun to install software packages onto machines for their consumers. This helps reduce the amount of required set up work for the user. The supplier installed software, however, tends to be user neutral (i.e., it is not personalized for the intended user).

User neutral installation often fails to account for issues that arise during replacement of existing computing systems. Presumably, the user of an existing computing system would like to migrate as much information as possible from the existing computing system to the new computing system. The user has already set up the existing computing system. If this set up information is not migrated, much, if not all, of the, effort spent by the user setting up the existing computing system is lost. This is especially problematic when the set up includes establishing a relationship with an internet service provider ("ISP") and/or computer network.

Establishing an ISP relationship usually involves communicating with the ISP and configuring an existing computing system to operate with an ISP server.

Conventional techniques for minimizing a users set up work often fail to address the inconveniences encountered by a user that desires to upgrade a computing system yet maintain prior data and configuration settings.

Additionally, the conventional solutions do not typically account for third-party involvement and, as such, fail to eliminate the set up time associated with establishing an ISP or network relationship.

SUMMARY

In accordance with the present disclosure, a method and system for migrating configuration settings into a computing system are disclosed that provide significant advantages over prior systems. The disclosed embodiments allow a user, who is acquiring a new computing system, to benefit from prior efforts expended setting up an existing computing system.

According to one aspect of the present disclosure, a user places an order with a computer supplier for a computing system. The computer supplier determines whether the user placing the order has an existing internet service provider (ISP) relationship. If the user does have an existing ISP relationship, the computer supplier contacts the ISP with which the user has a relationship and obtains configuration data associated with the existing ISP relationship. The configuration data may include, for example, the customer's ISP settings (e.g., ISP local phone number, script file to run, and server assigned address). The computer supplier may then provide the user with a computing system that is operable to access this configuration data and use it to access the Internet via the user's existing ISP relationship. As such, the user may be spared the hassle of establishing a new or additional ISP relationship for the supplied computing system.

In one embodiment, the configuration data may be stored in a memory, which is a part of the supplied computing system, before the user takes possession of the supplied computing system. In another embodiment, the configuration data may be stored remotely, and the supplied computing system may be programmed to access the configuration data before attempting to access the Internet via the customer's existing ISP relationship.

According to another aspect of the present invention, a computer supplier may supply a user with a computing system. The supplied computing system may include, for example, an ISP connection program that accesses configuration data. The configuration data may be stored, for example, in a local memory or a remote memory. Preferably, the configuration data allows a user to use the computing system to access the Internet via an existing ISP relationship.

Recycling a portion of the set up time associated with establishing an ISP relationship (e.g., time spent contacting an ISP by phone and/or proceeding through a series of steps that define the way in which a user prefers to correspond with the Internet) is a technical advantage of the above-discussed embodiments.

Simplified Internet access with a supplied computing system is another technical advantage provided by embodiments of the present disclosure.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Figure 1:
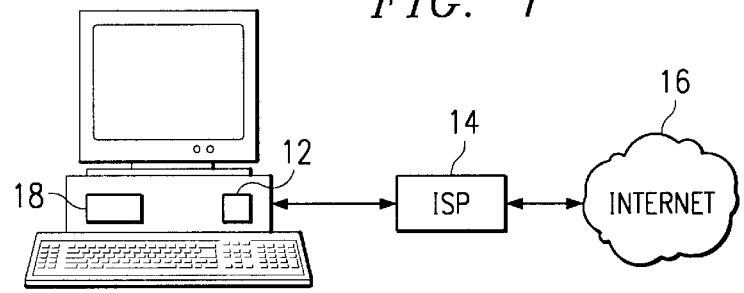
FIG. 1 depicts a computing system incorporating teachings of the present disclosure, the computing system including an ISP connection program that facilitates migration of configuration data.
Figure 2:
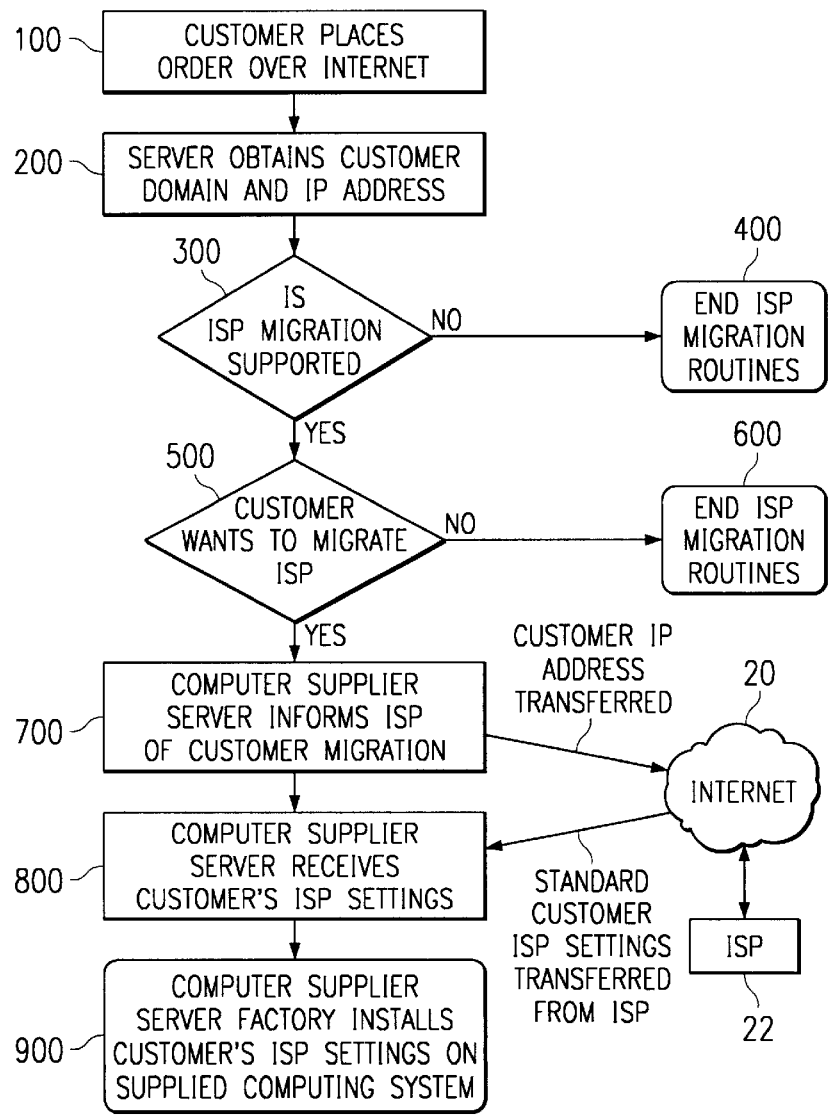
FIG. 2 shows a flow diagram depicting a method incorporating teachings of the present disclosure for migrating configuration settings into a supplied computing system.

Preferred embodiments and their advantages are best understood by reference to FIGS. 1 and 2, wherein like numbers are used to indicate like and corresponding parts.

FIG. 1 depicts computing system 10 incorporating teachings of the present disclosure. Computing system 10 preferably includes an ISP connection program, representatively depicted at 12, that facilitates migration of configuration data.

Computing system 10 may be operable to connect via an internet service provider ("ISP"), representatively depicted at 14, to a network cloud 16 (e.g., the Internet). When a user attempts to access network cloud 16, computing system 10 accesses ISP connection program 12. ISP connection program 12 may be stored either locally (e.g., in local memory 18) or remotely. Preferably, computing system 10 accesses ISP connection program during the user's initial attempt to access network cloud 16. During subsequent attempts to access network cloud 16, computing system 10 may not need to access ISP connection program 12.

In embodiments that store ISP connection program 12 locally (e.g., in local memory 18), computing system 10 may operate as if the user has already established an ISP relationship with ISP 14. The user may proceed through a typical series of steps (e.g., double-clicking on an icon representing ISP 14, typing in a user identification and password, and accessing network cloud 16 via ISP 14). Behind the scene, computing system 10 may access ISP connection program 12, which may be stored in local memory 18. ISP connection program 12 may access data, which may also be stored locally (e.g., in local memory 18) or remotely. The configuration data may include, for example, ISP settings associated with an existing relationship between ISP 14 and a user. Typical ISP settings include the following:

1. ISP phone number (local POP)
2. Country code
3. (yes/no) Use country code and area code
4. Connect using (specific platform device—modem)
5. Type of dial-up server
6. (yes/no) Log onto network
7. (yes/no) Enable software compression
8. (yes/no) Require encrypted password
9. (yes/no) Allowed network protocols (NetBEUI, IPX/SPX, TCP/IP)
10. Script file to run (path to file)
11. (yes/no) Step through script
12. (yes/no) Start terminal screen minimized
13. (integer value) Speaker volume
14. (integer value) Maximum device speed
15. (yes/no) Only connect at this speed
16. (integer value) Data bits
17. (selection value) Parity
18. (integer value) Stop bits
19. (yes/no) Wait for dial tone before dialing
20. (yes/no) Cancel the call if not connected within (integer value) seconds
21. (yes/no) Disconnect a call if idle for more than (integer value) minutes
22. (yes/no) Server assigned IP address
23. (yes/no) Specify an IP address (IP address value)
24. (yes/no) Server assigned name server address
24. (yes/no) Server assigned name server address
25. (yes/no) Specify name server address (4 sets of IP addresses: Primary DNS; secondary DNS; Primary WINS secondary WINS)
26. (yes/no) Use IP header compression
27. (yes/no) Use default gateway on remote network
28. (yes/no) Use FIFO buffers (2 integer values: Receive buffer; and Transmit buffer)
29. (yes/no) Use error control (3 Binary values: Require to connect (yes/no); Compress Data (yes/no); and Use cellular protocol (yes/no))
30. (yes/no) Use flow control (2 binary values: Hardware (yes/no); and Software (yes/no))
31. Modulation type (various string values)
32. Extra settings (string value)
33. (yes/no) Record a log file
34. (yes/no) Bring up terminal window before dialing
35. (yes/no) Bring up terminal window after dialing
36. (yes/no) Operator assisted or manual dial
37. (yes/no) Wait for credit card tone (in seconds)
38. (yes/no) Display modem status The configuration data may help to define some parameters of an existing ISP relationship. In one embodiment, each ISP relationship may have unique configuration data, which might allow the configuration data to identify a user associated with a given ISP relationship.

By accessing user specific configuration data, ISP connection program 12 may connect to network cloud 16 via ISP 14 without requiring a user to establish or re-establish an ISP relationship for computing system 10. This may be especially beneficial in build-to-order computing systems (i.e., computing systems uniquely manufactured for a given user). With build-to-order computing systems, users tend to expect more customization.

A method for accessing and migrating configuration data may be better understood by referencing FIG. 2. FIG. 2 shows a flow diagram depicting a method incorporating teachings of the present disclosure for migrating configuration settings into a supplied computing system. At step 100, a customer places an order for a supplied computing system. As depicted in FIG. 2, the customer may place the order on line using the Internet. At step 200, a server associated with the computer supplier may obtain identification information about the customer (e.g., customer domain name and IP address). Typically, this type of identification information may be obtained with minimal effort. The flowchart of FIG. 2 depicts step 200 following immediately after step 100. In practice, step 200 may occur sequentially before or after this depicted time.

At step 300, a migration program may determine whether or not migration of configuration settings may be supported with the current customer (i.e., determine whether the customer's existing computing system and/or ISP will support data migration). If data migration cannot be supported, an ISP migration routine may be terminated at step 400. If data migration may be supported, the ISP migration routine may proceed to step 500.

At step 500, the customer may be prompted to determine whether or not the consumer would like to have his or her ISP configuration settings migrated to the supplied computing system. If the customer responds in the negative, the ISP migration routine may be terminated at step 600. If the consumer responds affirmatively, the routine may continue to step 700.

At step 700, the server associated with the computer supplier may contact via internet 20 an ISP 22 with whom the customer has an existing ISP relationship. Once connected, the server associated with the computer supplier may transfer the consumer's identification information to ISP 22. Preferably, the computer supplier will have established a relationship with the ISP and will pass the customer's identification information via a pre-determined address.

At step 800, the computer supplier may receive from ISP 22 an encrypted file including a configuration data nugget for the consumer. The configuration data nugget may include data necessary to allow a computing system to access the Internet via the customer's existing ISP relationship. This file may, in some embodiments, be sent to the computer supplier as an encrypted file. The encrypted file may then be decrypted by the computer supplier.

At step 900, the configuration data may be factory installed into a local memory associated with the supplied computing system. As such, when the customer receives the supplied computing system, the customer will be able to access the Internet with the supplied computing system via the customer's existing ISP relationship. Alternatively, the configuration data may be stored remotely or on a computer readable medium, which may be supplied to the customer with the supplied computing system.

Although the present invention has been described in detail, it should be understood that various changes, substitutions and alterations can be made thereto without departing from the spirit and scope of the invention as defined by the appended claims.

What is claimed is:

1. A computing system comprising:
   a processor operable to run an internet service provider connection program;
   the internet service provider connection program operable to access a configuration data nugget;
   the configuration data nugget comprising migrated data acquired by a computer supplier from an internet service provider prior to shipment of the computing system to a customer; and
   the migrated data operable to allow the computing system to access the Internet via an existing internet service provider relationship.

2. The computing system of claim 1, further comprising a local memory storing the configuration data nugget.

3. The computing system of claim 1, wherein the computing system comprises a build-to-order computer.

4. The computing system of claim 1, wherein the configuration data nugget comprises selected internet service provider settings.

5. The computing system of claim 1, further comprising a monitor, a keyboard and a computer readable medium having the configuration nugget.

6. A method for migrating configuration settings for a supplied computing system, comprising:
   receiving an order to provide a supplied computing system to a customer;
   obtaining identification information for the customer; and
   if the customer has an existing internet service provider relationship with an internet service provider:
      contacting the internet service provider from a computer supplier site to acquire internet service provider settings associated with the customer; and
      migrating the internet service provider settings from the internet service provider prior to shipment of the supplied computing system to the customer.

7. The migrating method of claim 6, wherein the migrated data migrates from an internet service provider server.

8. The migrating method of claim 7, further comprising:
   passing the identification information for the customer to the internet service provider; and
   receiving from the internet service provider the internet service provider settings associated with the customer in an encrypted file.

9. The migrating method of claim 7, further comprising:
   loading the internet service provider settings on a local memory of the supplied computing system; and
   shipping the supplied computing system to the customer.

10. The migrating method of claim 6, further comprising:
    saving the migrated internet service provider settings on a computer readable medium; and
    supplying the customer with the supplied computing system and the computer readable medium.

11. The migrating method of claim 10, wherein the supplied computing system comprises the computer readable medium.

12. The migrating method of claim 6, further comprising:
    if the customer has an existing internet service provider relationship with an internet service provider:
       determining whether the customer wants to maintain the existing internet service provider relationship.

13. The migrating method of claim 12, further comprising:
    if the customer does not want to maintain the existing internet service provider relationship:
       determining whether the customer wants to establish a new internet service provider relationship.

14. The migrating method of claim 6, further comprising:
    passing the identification information for the customer to the internet service provider; and
    receiving from the internet service provider the internet service provider settings associated with the customer.

15. The migrating method of claim 6, further comprising:
    passing the identification information for the customer to the internet service provider;
    receiving from the internet service provider the internet service provider settings associated with the customer in an encrypted file; and
    decrypting the encrypted file.

16. An automated system for migrating configuration settings to a computing system, the automated system comprising:
    a computer supplier server operable to connect to a internet service provider server via a network cloud;
    a migration engine running on the computer supplier server, the migration engine operable to migrate internet service provider settings from the internet service provider server to the computer supplier server prior to shipment of the computing system to the customer;
    a pre-load engine communicatively coupled with the migration engine, the pre-load engine operable to save a configuration data nugget comprising the migrated internet service provider settings on a computer readable medium; and
    a computing system operable to access the configuration data nugget and use the configuration data nugget to access the Internet via the internet service provider server.

17. The automated system of claim 16, wherein the computing system comprises the computer readable medium.

18. The automated system of claim 17, wherein the computing system comprises a build-to-order computer.

19. The automated system of claim 17, wherein the configuration data nugget comprises internet service provider settings.

20. The automated system of claim 17, further comprising:
    a decryption engine running on the computer supplier server, the decryption engine operable to decrypt an encrypted file received from the internet service provider server; and
    the encrypted file comprising internet service provider settings.

* * * * *